United States Patent
Keys, II et al.

(10) Patent No.: US 9,037,346 B2
(45) Date of Patent: May 19, 2015

(54) STEERING CONTROL FOR VEHICLE TRAINS

(71) Applicant: DEERE & COMPANY, Moline, IL (US)

(72) Inventors: Gary S. Keys, II, Cedar Falls, IA (US); Christopher A. Myers, Cedar Falls, IA (US); Craig A. Puetz, Waterloo, IA (US); Andrew K. Rekow, Cedar Falls, IA (US); Alan D. Sheidler, Moline, IL (US); Noel W. Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/529,781

(22) Filed: Oct. 31, 2014

(65) Prior Publication Data

US 2015/0051795 A1    Feb. 19, 2015

Related U.S. Application Data

(63) Continuation-in-part of application No. 13/241,898, filed on Sep. 23, 2011.

(51) Int. Cl.
| | | |
|---|---|---|
| *G06F 7/00* | (2006.01) | |
| *B60W 10/20* | (2006.01) | |
| *B60D 1/24* | (2006.01) | |
| *B60D 1/30* | (2006.01) | |
| *B62D 11/04* | (2006.01) | |
| *B62D 13/00* | (2006.01) | |
| *B62D 59/04* | (2006.01) | |

(52) U.S. Cl.
CPC ........... *B60W 10/20* (2013.01); *B60W 2530/10* (2013.01); *B60D 1/248* (2013.01); *B60D 1/30* (2013.01); *B62D 11/04* (2013.01); *B62D 13/00* (2013.01); *B62D 59/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,860,081 | A * | 1/1975 | Moll et al. | 180/14.3 |
| 3,972,543 | A * | 8/1976 | Presley et al. | 280/455.1 |
| 4,771,838 | A * | 9/1988 | Ketcham | 180/6.62 |
| 5,579,228 | A | 11/1996 | Kimbrough et al. | |
| 5,662,450 | A * | 9/1997 | Roberts | 414/347 |
| 6,042,196 | A * | 3/2000 | Nakamura et al. | 303/7 |
| 6,434,462 | B1 * | 8/2002 | Bevly et al. | 701/50 |
| 7,054,731 | B1 * | 5/2006 | Lange et al. | 701/50 |
| 7,225,891 | B2 * | 6/2007 | Gehring et al. | 180/14.2 |
| 7,266,477 | B2 * | 9/2007 | Foessel | 702/189 |
| 7,272,481 | B2 * | 9/2007 | Einig et al. | 701/70 |
| 7,743,859 | B2 * | 6/2010 | Forsyth | 180/65.1 |
| 7,798,263 | B2 * | 9/2010 | Tandy et al. | 180/14.6 |
| 7,925,409 | B2 * | 4/2011 | Fry et al. | 701/70 |
| 8,025,117 | B2 * | 9/2011 | Bennett et al. | 180/65.51 |
| 8,260,518 | B2 * | 9/2012 | Englert | 701/72 |

(Continued)

*Primary Examiner* — Ian Jen
(74) *Attorney, Agent, or Firm* — Quarles & Brady LLP

(57) ABSTRACT

A steering control system is disclosed for a vehicle train with a tow vehicle, a first towed vehicle with at least one ground-engaging member, and a second towed vehicle. A steering assembly may be configured to control steering of the at least one ground-engaging member. One or more sensing devices may be configured to determine orientation information for one or more of the tow vehicle, the first towed vehicle, and the second towed vehicle, during operation of the vehicle train. A steering correction may be determined for the second towed vehicle based upon the determined orientation information. The steering correction may be applied for the second towed vehicle by controlling the steering assembly to steer the first towed vehicle.

20 Claims, 8 Drawing Sheets

(56) References Cited

U.S. PATENT DOCUMENTS

| | | | |
|---|---|---|---|
| 8,308,182 B2* | 11/2012 | Ortmann et al. | 280/477 |
| 8,311,693 B2* | 11/2012 | Wu et al. | 701/22 |
| 8,544,574 B2 | 10/2013 | Fegley et al. | |
| 8,577,558 B2 | 11/2013 | Mitchell | |
| 2001/0003393 A1* | 6/2001 | Cooper | 280/411.1 |
| 2003/0029651 A1* | 2/2003 | Palmeri | 180/65.1 |
| 2003/0160428 A1* | 8/2003 | Lindell et al. | 280/432 |
| 2004/0070172 A1* | 4/2004 | Colistro | 280/472 |
| 2005/0199671 A1* | 9/2005 | Riley | 224/512 |
| 2005/0206225 A1* | 9/2005 | Offerle et al. | 303/7 |
| 2005/0206231 A1* | 9/2005 | Lu et al. | 303/146 |
| 2007/0193795 A1* | 8/2007 | Forsyth | 180/65.4 |
| 2008/0169144 A1* | 7/2008 | DeGrave et al. | 180/165 |
| 2008/0195268 A1 | 8/2008 | Sapilewski et al. | |
| 2011/0005848 A1* | 1/2011 | Kvist et al. | 180/65.22 |
| 2011/0121544 A1* | 5/2011 | Pearce | 280/641 |
| 2011/0121555 A1* | 5/2011 | Anderson | 280/837 |
| 2011/0155389 A1* | 6/2011 | Burtz et al. | 166/369 |
| 2013/0022430 A1 | 1/2013 | Anderson et al. | |
| 2013/0076497 A1 | 3/2013 | Sheidler et al. | |
| 2013/0079979 A1* | 3/2013 | Sheidler et al. | 701/36 |
| 2013/0079980 A1 | 3/2013 | Vuk et al. | |

* cited by examiner

STEERING CONTROL FOR VEHICLE TRAINS

CROSS-REFERENCE TO RELATED APPLICATION(S)

This application is a continuation-in-part of application Ser. No. 13/241,898, which was filed on Sep. 23, 2011.

STATEMENT OF FEDERALLY SPONSORED RESEARCH OR DEVELOPMENT

Not applicable.

FIELD OF THE DISCLOSURE

The present disclosure relates to steering control for vehicle trains, arrangements for towing a towed vehicle behind a tow vehicle and, more particularly, to arrangements for towing a towed implement behind a work vehicle.

BACKGROUND OF THE DISCLOSURE

When using agricultural equipment, it is common to pull a towed vehicle behind a tow vehicle. For example, during a harvesting operation, it is common to pull a grain cart or gravity box behind a tractor. When the grain bin in the combine is full, the grain cart or gravity box is pulled along side of the combine, the unloading auger is swung to the side of the combine, and the grain is offloaded into the cart or gravity box. The full cart or gravity box may then be transported to a dryer location, such as an on-farm batch or bin dryer, or a local elevator.

As another example, it is also common to pull a fertilizer spreader behind a tractor for application of fertilizer, lime, etc. to an agricultural field.

As still another example, it may be useful to pull a series of vehicles in a train behind a tow vehicle. For example, a ground-conditioning implement may be towed behind a tractor in series with a commodity cart for transporting fertilizer, pesticide, or other material. Similarly, a seed-planting implement may be towed behind a tractor in series with a commodity cart for transporting seeds.

When pulling a towed vehicle such as an agricultural cart, wagon, spreader or the like behind a tractor, the weight of the towed vehicle when full with product can be substantial. For this reason, it is common to use a relatively large tractor to pull such a towed vehicle. The weight effects of a towed vehicle on a tow vehicle are further compounded when a number of towed vehicles are connected together in a train arrangement, such as a number of loaded gravity boxes which are trained together and pulled to a dryer location using a single tractor.

What is needed in the art is a way of towing a heavy towed vehicle or train of towed vehicles, without adversely affecting the operation of the tow vehicle, the towed vehicle, or other vehicles in the train.

SUMMARY OF THE DISCLOSURE

A system and method is disclosed for steering control of vehicle trains with a tow vehicle and first and second towed vehicles.

According to one aspect of the disclosure, a steering assembly may be configured to control steering of at least one ground-engaging member of the first towed vehicle. One or more sensing devices may be configured to determine orientation information for one or more of the tow vehicle, the first towed vehicle, and the second towed vehicle, during operation of the vehicle train. A steering correction may be determined for the second towed vehicle based upon the identified orientation information. The steering correction may be applied for the second towed vehicle by controlling the steering assembly of the first towed vehicle to steer the first towed vehicle.

In certain embodiments, the first towed vehicle may be towed by the tow vehicle via a first towing connection connecting the tow vehicle to the first towed vehicle, and the second towed vehicle may be towed by the first towed vehicle via a second towing connection connecting the first towed vehicle to the second towed vehicle.

In certain embodiments, the second towed vehicle may be towed by the tow vehicle via a first towing connection connecting the tow vehicle to the second towed vehicle, and the first towed vehicle may be towed by the second towed vehicle via a second towing connection connecting the second towed vehicle to the first towed vehicle.

In certain embodiments, based upon the identified orientation information, an angle may be determined between the first or second towing connection and various of the tow vehicle, the first towed vehicle, and the second towed vehicle. The steering correction may be determined based upon the determined angle.

In certain embodiments, travel of the tow vehicle, the first towed vehicle, or the second towed vehicle over sloping terrain may be identified. The steering correction may be determined to correct for down-slope movement of the first or second towed vehicle due to the sloping terrain.

In certain embodiments, the steering assembly may include an actuator for adjusting a direction of travel of the at least one ground-engaging member, and applying the steering correction may include controlling the actuator to adjust the direction of travel of the at least one ground-engaging member.

In certain embodiments, the steering assembly may include a first motor for powering movement of a first ground-engaging member of the first towed vehicle, in order to move the first towed vehicle, and a second motor for powering movement of a second ground-engaging member of the first towed vehicle, in order to move the first towed vehicle. Applying the steering correction may include controlling at least one of the first and second motors to steer the first towed vehicle by causing a speed difference between respective ground-engaging speeds of the first and second ground-engaging members.

In certain embodiments, the first ground-engaging member may be determined to be disposed down-slope of the second ground-engaging member, with respect to the sloping terrain. Applying the steering correction may include controlling the first or second motor such that the first ground-engaging member operates at a higher ground-engaging speed than the second ground-engaging member.

In certain embodiments, the one or more sensing devices may include a GPS device or an angle-measuring device. The first towed vehicle may include a commodity cart and the second towed vehicle may include a seed-planting implement.

In certain embodiments, the steering correction may be applied during reverse or turning travel of the vehicle train.

The details of one or more implementations of the disclosure are set forth in the accompanying drawings and the description below. Other features and advantages will become apparent from the description, the drawings, and the claims.

BRIEF DESCRIPTION OF THE DRAWINGS

Like reference numerals in the drawings indicate like components, parts, or operations.

DETAILED DESCRIPTION

The following describes one or more example implementations of the disclosed system and method, as shown in the accompanying figures of the drawings described briefly above.

Figure 1:
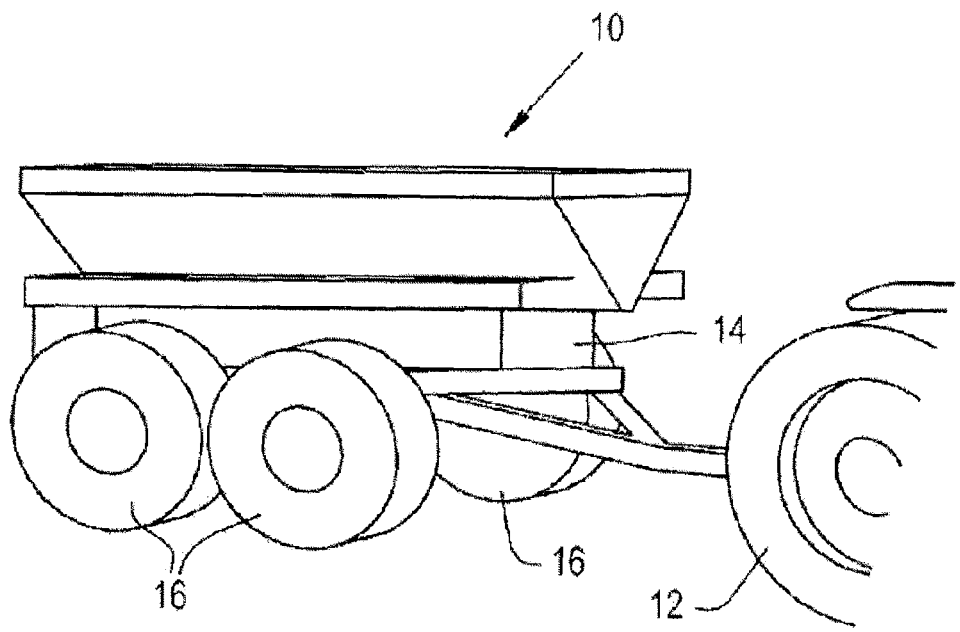
FIG. 1 is a perspective view of an embodiment of a towed vehicle of the present disclosure in the form of a fertilizer spreader.

Referring now to the drawings, and more particularly to FIG. 1, there is shown an embodiment of a vehicle arrangement of the present disclosure including a towed vehicle 10 which is towed by a tow vehicle 12. Towed vehicle 10 is shown in the form of a fertilizer spreader in FIG. 1, but could be any type of other towed vehicle. For example, towed vehicle 10 could also be in the form of a grain cart, a gravity box, and air cart, etc.

Figure 2:
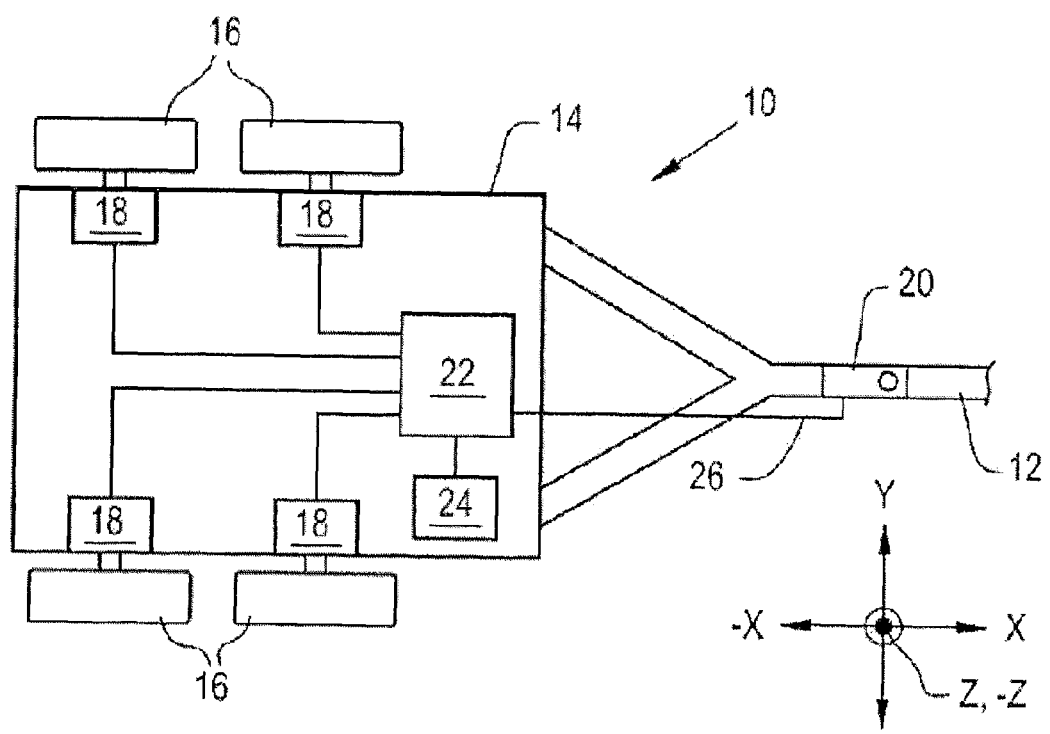
FIG. 2 is a schematic view of the fertilizer spreader shown in FIG. 1.

Towed vehicle 10 (FIGS. 1 and 2) generally includes a frame 14, at least two wheels 16 carried by frame 14, at least one motor 18, a load sensing hitch 20, and an electrical processing circuit 22. In the illustrated embodiment, towed vehicle 10 includes four wheels 16, but may include a different number of wheels, depending on the application.

Towed vehicle 10 is shown as including four motors 18 which are respectively coupled with a corresponding wheel 16. However, towed vehicle 10 need not necessarily include a motor 18 associated with each corresponding wheel 16. For example, towed vehicle 10 could be provided with a pair of motors 18 with a single motor on each side. Motors 18 are assumed to be electric motors in the illustrated embodiment, but could be differently configured depending on the application, such as hydraulic motors.

When configured as electric motors, it is desirable to provide towed vehicle 10 with an onboard source of electrical power, such as a single battery 24 or a bank of batteries. The electrical power could also be obtained from an onboard internal combustion engine (i.e., the alternator/generator output of such an engine). Alternatively, it is also possible to obtain electrical power from a similar electrical source onboard tow vehicle 12.

Load sensing hitch 20 senses a load along an axis which is generally perpendicular to a longitudinal or travel direction of towed vehicle 10 and/or tow vehicle 12. Load sensing hitch 20 may also be configured to sense loads along 3 separate axes defining a 3-D coordinate system, but for purposes of this disclosure, it is the lateral direction that is important. In the illustrated example, load sensing hitch 20 may be provided with load cells to sense loads along the plus or minus X, Y and/or Z directions (the Z direction extending perpendicular to the drawing plane of FIG. 2). A load sensed in the transverse or lateral (Y) direction may be used, e.g., to sense a turning maneuver or wheel dropping into a hole, and in turn apply an acceleration or braking torque to achieve a torque vectoring of towed vehicle 10.

The specific configuration of load sensing hitch 20 may vary, depending on the application. For example, load sensing hitch 20 may include one or more load cells for detecting lateral loading. Moreover, load sensing hitch 20 is shown as being coupled with and carried by a portion of the tongue or hitch of towed vehicle 10, but could also be carried by the hitch extending rearward from tow vehicle 12, or even potentially partially carried by each of towed vehicle 10 and tow vehicle 12. Other configurations are also possible.

Electrical processing circuit 22 receives an output signal from load sensing hitch 20 and actuates one or more motors 18, dependent upon the output signal. Electrical processing circuit 22 is shown as being connected with load sensing hitch 20 via a single line 26, but could be coupled in a different manner such as a data bus, wireless connection, etc.

More specifically, electrical processing circuit 22 compares a value of the output signal from load sensing hitch 20 representing lateral loading with an acceptable load range. If the value of the output signal falls within this acceptable load range, then none of the motors 18 are actuated. On the other hand, if the value of the output signal falls outside of this acceptable load range, then one or more motors 18 are actuated to apply a desired thrust or braking action to the corresponding wheel. In this manner, towed vehicle 10 is independently accelerated or decelerated apart from any pulling force applied by tow vehicle 12. Electrical processing circuit 22 actuates one or more motors 18 such that an amount of thrust or braking that is applied to a corresponding motor 18 is proportional to a magnitude of the lateral hitch loading.

It is also possible to limit the torque which is applied to a motor 18 such that damage does not occur to the chassis, drive train, etc. For example, electrical processing circuit 22 may be configured to apply a command signal effecting a maximum torque to a given motor 18 and wheel 16 which is less than a maximum threshold amount. Furthermore, it may be possible to simply limit the maximum output torque of a given motor 18 so that the maximum torque is below a threshold value.

Figure 3:
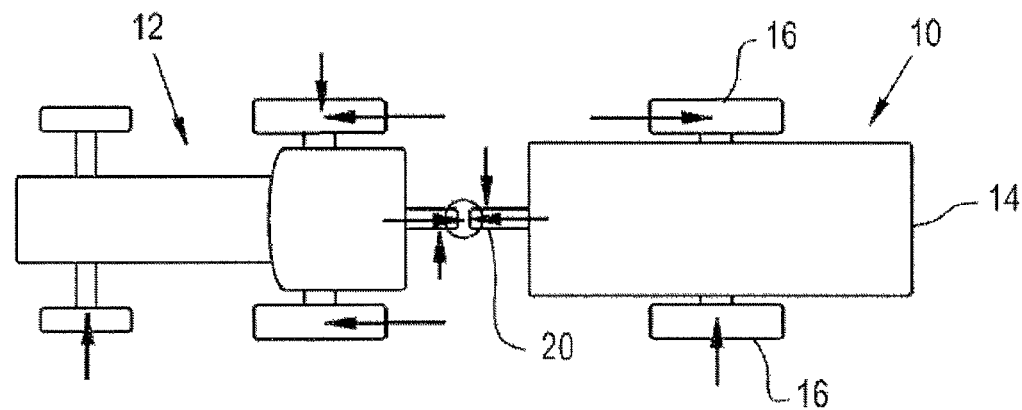
FIG. 3 is a schematic top view of a towed vehicle when encountering an obstruction, showing reactionary forces.

Referring now to FIG. 3, there is shown a top schematic view of a hypothetical occurrence in which a wheel of a towed vehicle in the form of a towed implement falls into a hole in a field. More specifically, as tow vehicle (tractor) 12 is moving forward, the right hand wheel of the towed implement 10 encounters an obstruction in the form of a hole in the field. The obstruction resists forward motion of towed implement 10, which causes towed implement 10 to decelerate but due to the uneven loading on the right hand side of towed implement 10, a moment is also created. Due to the deceleration of towed implement 10, there is an instantaneous increase in the hitch load along the direction of travel. The tractor 12 sees a reaction force from towed implement 10 directly opposite the direction of travel. The induced moment in towed implement 10 from the obstruction creates a force vector to the left on the implement side of the hitch. The tractor side of the hitch reacts the implement side force but this reaction force is to the right.

The tractor drive tires also react the force from the hitch, but this time the force is to left. The front tractor tires also must react to the hitch load as shown. The reaction forces generated by the resistance force of the obstruction cause an increase in the hitch tension and side loading in the hitch. If the side loading is sufficiently large, the rear of the tractor can inadvertently slide to the left. The driver may have to steer the tractor to compensate for these effects.

Figure 4:
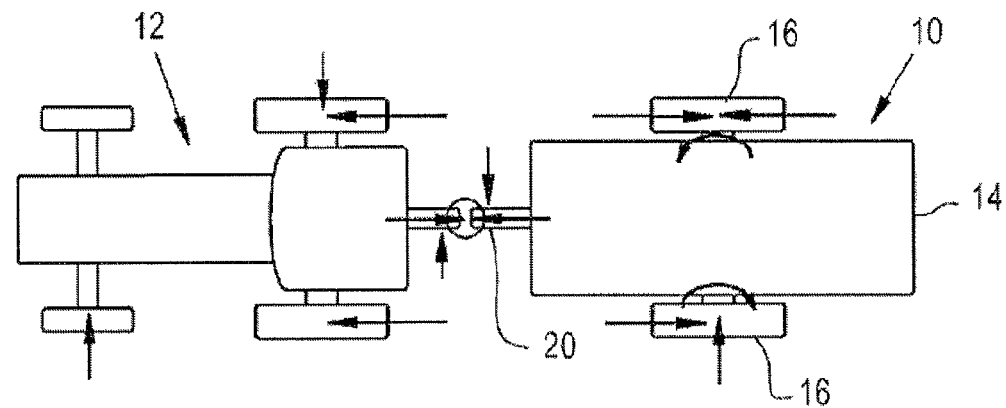
FIG. 4 is a schematic top view of a towed vehicle when encountering an obstruction, but with electric motor(s) actuated.

Referring now to FIG. 4, there is shown a top schematic view of a hypothetical occurrence similar to FIG. 3, but in this instance electric motors in towed implement 10 are actuated to counteract the obstruction. More specifically, as tow vehicle 12 is moving forward, the right hand wheel of towed implement 10 encounters an obstruction in the form of a hole. The obstruction resists forward motion of towed implement 10. This causes towed implement 10 to decelerate but due to the uneven loading on the right hand side of towed implement 10, a moment is also created. Due to the deceleration of towed implement 10, there is an instantaneous increase in hitch load along the direction of travel. There is an increase in the load on load sensing hitch 20 along the direction of travel and to the side as in FIG. 3, and the load sensor in load sensing hitch 20 detects these perpendicular forces. Electrical processing circuit 22 receives the sensed change in side loading and draft load, and computes the magnitude of the resistance force vector from the obstruction. Electrical processing circuit 22 commands electric motors 18 in towed implement 10 to respond to reduce or eliminate the resistance force vector. The right hand wheel motor provides positive driving torque and the left hand motor provides braking torque, if needed. In this way, the trailer moment due to the obstruction is negated. Tractor 12 can more easily maintain a straight trajectory requiring minimal or no steering corrections. Since energy can be transferred electrically from the left hand motor (a generator) to the right hand motor (a motor), much of the trailer moment can be negated without addition of energy to the system. If a storage battery is added to the system, both motors can work as motors to reduce the draft load to the tractor to negotiate severe obstructions.

Figure 5:
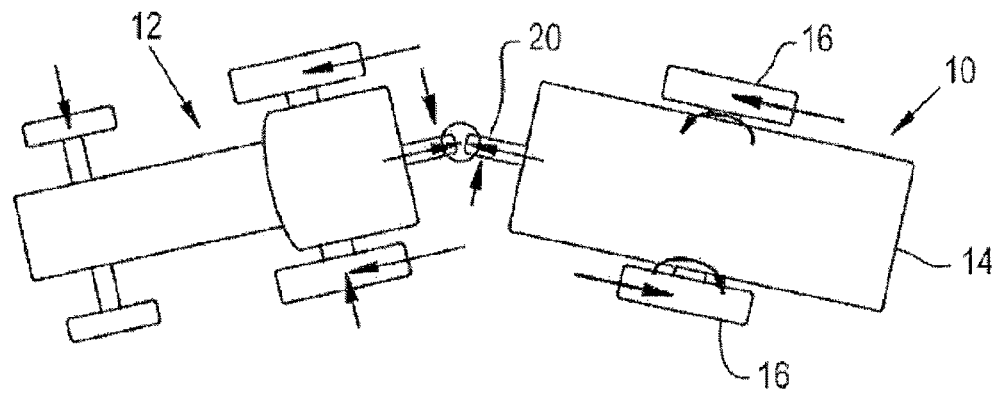
FIG. 5 is a schematic top view of a towed vehicle when turning, showing reactionary forces, and with electric motor(s) actuated.

Referring now to FIG. 5, there is shown a top schematic view of a hypothetical occurrence in which tow vehicle or tractor 12 turns and towed implement 10 uses electric motors to counteract moments. More specifically, as the vehicle is moving forward, the tractor turns to the left. Depending on the speed and direction, a moment is generated in the trailer. The electric drive motor 18 at each wheel 16 responds to counteract the induced moment. The trailer hitch load sensor is equipped with an angle sensor to determine the hitch angle between tractor 12 and implement 10 while steering. If the draft loads and side loads of the hitch do not correspond to the expected steering maneuver, electrical processing circuit 22 commands drive motors 18 at each wheel 16 to provide drive torque or braking torque to reduce the hitch side load. Tractor 12 is able to complete the steering maneuver more accurately, without tractor 12 sliding sideways or having to correct by over- or under-steering. Centrifugal force can also be considered as an externally acting force and is computed by electrical processing circuit 22 according to the travel speed and hitch angle.

Figure 6:
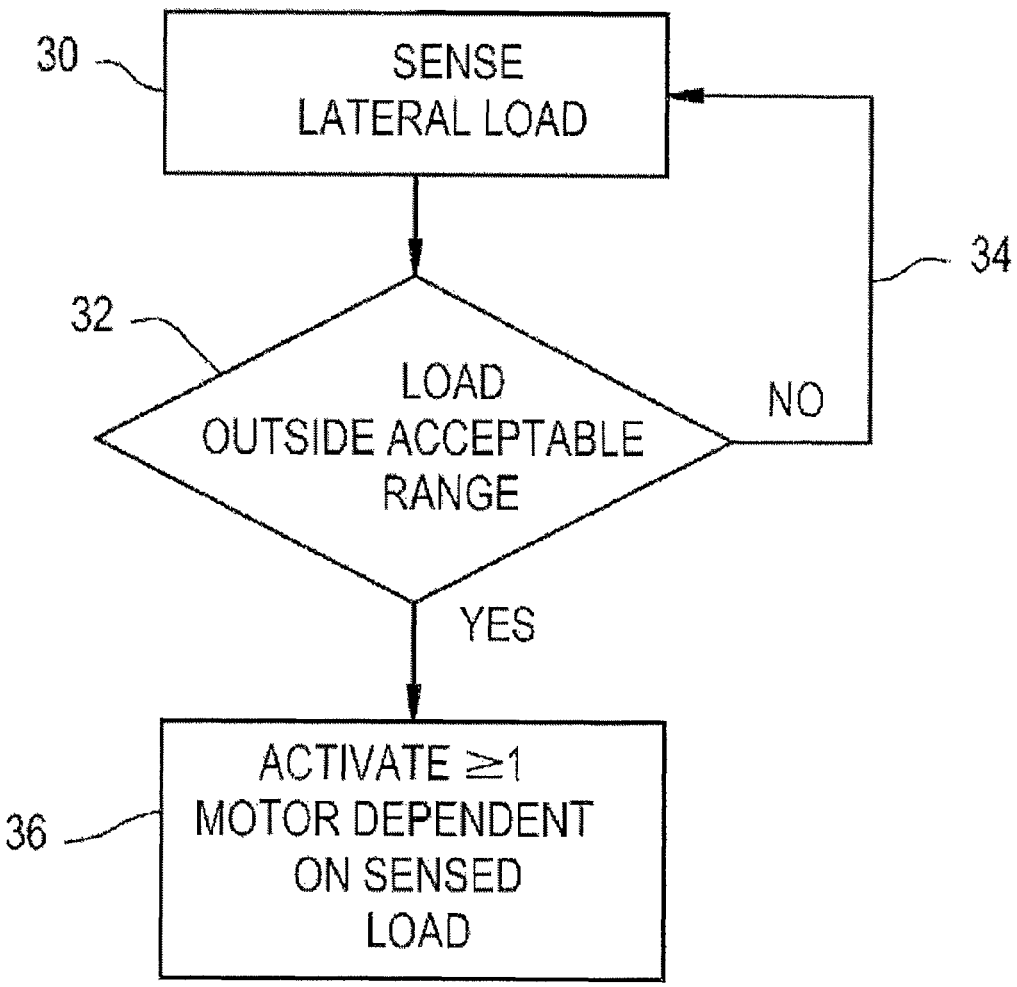
FIG. 6 is a flowchart illustrating an embodiment of a method of the present disclosure for towing a towed vehicle.

Referring now to FIG. 6, there is shown a simplified illustration of a method of towing a towed vehicle 10 of the present disclosure. At box 30, a lateral load on load sensing hitch 20 is sensed. If the output signal for the sensed lateral load falls within a given acceptable range, then tow vehicle 12 simply continues to pull the towed vehicle 10 without assistance from motors 18 (block 32 and line 34). On the other hand, if the output signal for the sensed lateral load falls outside of a given acceptable range, then electrical processing circuit 22 actuates one or more electric motors 18 to apply a thrust or braking action to a corresponding wheel 16, as desired and appropriate (block 36).

The present disclosure has an advantage in that a large tow vehicle 12 is no longer needed to pull or tow a heavy towed vehicle 10. This allows the size of the tow vehicle 12 to be decreased, which in turn decreases the cost of the required vehicle as well as associated operating costs like fuel, etc. The towed vehicles 10 can even be coupled together in a train arrangement while still allowing the use of a relatively small tow vehicle 12.

Where various towed vehicles are arranged in a vehicle train (i.e., a series of two or more vehicles towed behind a tow vehicle), it may be useful to control one or more vehicles of the train in order to collectively guide the steering of the vehicle train as a whole or of particular vehicles included in the train. For example, in certain vehicle trains, a powered towed vehicle (i.e., a towed vehicle with powered wheels or other ground-engaging elements) may be connected to a tow vehicle via an unpowered towed vehicle (i.e., a towed vehicle without powered wheels or other ground-engaging elements). In such a configuration, it may be useful to control steering of the unpowered towed vehicle (and of the vehicle train generally) through control of the steering of the powered towed vehicle. Similarly, where an unpowered towed vehicle is connected to a tow vehicle via a powered towed vehicle, it may be useful to control steering of the unpowered towed vehicle (and of the vehicle train generally) through control of the steering of the powered towed vehicle. A system and method for vehicle-train steering control, as described in greater detail below, may be useful in these and other instances.

The disclosed vehicle-train steering control system (and method) may be utilized with a variety of vehicle trains that generally include a tow vehicle and at least two towed vehicles, with at least one of the towed vehicles being configured as a powered towed vehicle, with individually powered wheels (or other ground-engaging members). Various examples below may present vehicle trains for planting operations, which may include a tractor as a tow vehicle, a seed-planting implement as a first towed vehicle, and a commodity cart as a second towed vehicle. It will be understood, however, that the disclosed control system (and method) may also be utilized with other vehicle trains, including vehicle trains for operations other than planting.

Figure 7A:
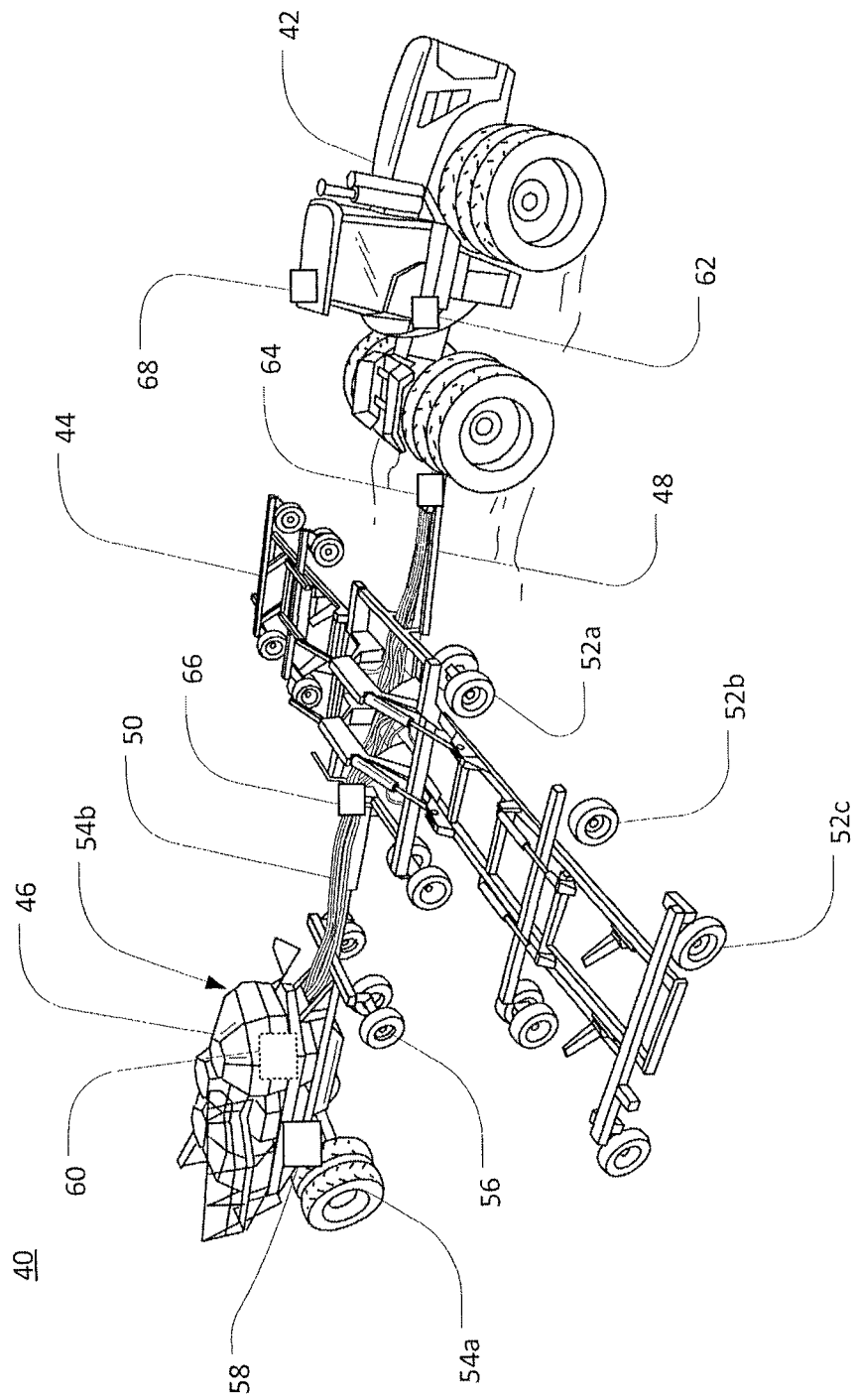
FIGS. 7A and 7B are perspective views of example vehicle trains that include a vehicle-train steering control system.

Referring also to FIG. 7A, in an example vehicle train 40 for planting operations, a tractor 42 serves as a tow vehicle for pulling a seed-planting implement 44 and a commodity cart 46 filled with seeds. A towing connection 48 (e.g., configured as a drawbar, linkage, three-point hitch, or other attachment structure) attaches the implement 44 to the tractor 42, such that towing force may be transmitted from the tractor 42 to the implement 44 via the connection 48. Similarly, a towing connection 50 (e.g., configured as a drawbar, linkage, three-point hitch, or other attachment structure) attaches the cart 46 to the implement 44, such that towing force may be transmitted from the implement 44 (and the tractor 42) to the cart 46 via the connection 50. Accordingly, as the train 40 moves over the field (e.g., as driven by motive force from the tractor 42), the three vehicles (i.e., the tractor 42, the implement 44, and the cart 46) travel in series.

Various hydraulic, pneumatic, electrical, and other conduits may extend between the tractor 42, the implement 44, and the cart 46 along the connections 48 and 50 (or otherwise). Such conduits may be useful, for example, for relaying control signals, transmitting hydraulic or pneumatic pressure, transferring seeds (or other commodities) from the cart 46 to the implement 44 (or otherwise), or for various other purposes. It will be understood that, in certain embodiments, wireless communication may be used in place of (or as a supplement to) various electrical (or other) conduits.

As depicted, each lateral side of the implement 44 is supported by sets of fixed-axle wheels 52, with a central set 52a being disposed relatively closely to the centerline of the implement 44, an outer set 52c being disposed relatively closely to the laterally outer end of the implement 44, and a middle set 52b being disposed between the central set 52a and the outer set 52c. It will be understood that other configurations may be possible. Further, in certain embodiments, one or more of the sets of fixed-axle wheels 52 may be replaced with other ground-engaging elements such as steerable wheels, casters, or tracks. In certain embodiments, various of the sets of wheels 52 may be replaced (or supplemented) with ground-engaging tools, which may themselves support some of the weight of the implement 44.

In the embodiment depicted, the wheels 52 are not powered wheels (i.e., the wheels 52 are rotated by contact with the ground, rather than through a motor, transmission, or other power train element). In certain embodiments, the wheels 52 (or other ground-engaging elements) may be powered. For example, the implement 44 (or another towed vehicle) may be provided with motors or other devices to actively rotate the wheels 52 (or otherwise power a different ground-engaging element). In this regard, because the wheels 52a may tend to support a larger portion of the weight of the implement 44 than the wheels 52b or 52c, it may sometimes be useful to power the wheels 52a rather than the wheels 52b or 52c. In other embodiments, however, the wheels 52b or 52c (or various combinations of any of the wheels 52) may be powered.

The cart 46 may also be supported by various wheels. As depicted, for example, the cart 46 is supported by sets of powered wheels 54 (with right-side wheels 54a and left-side wheels 54b), as well as by a set of unpowered support wheels 56. In certain embodiments, the wheels 54 may be replaced (or supplemented) with other ground-engaging elements. For example, the cart 46 (or a similar towed vehicle) may be equipped with tracks rather than wheels. Generally, ground-engaging elements (e.g., wheels or tracks) of a towed vehicle may be viewed as operating with particular ground-engaging speeds (e.g., the rotational speed of a wheel or a track) as the vehicle moves over the ground.

The powered wheels 54 (or other powered ground-engaging elements) for the cart 46 may be powered in various ways. As depicted, for example, a motor 58 is provided to power the right-side wheels 54a of the cart 46, and a separate motor 60 (see also FIG. 8A) is provided to power the left-side wheels 54b of the cart 46. The motors 58 and 60 may be configured as electric motors, hydraulic motors, or otherwise. In certain embodiments, the motors 58 and 60 may receive power from the tractor 42, via various conduits along the towing connections 48 and 50. For example, the tractor 42 may include a generator (not shown) to convert mechanical power from the engine (not shown) of the tractor 42 into electrical power, which may then be transmitted to the motors 58 and 60 over electrical lines extending between the tractor 42 and the cart 46. Various power electronics (not shown) or other control structures (e.g., hydraulic valve assemblies) may be included on the cart 46 or elsewhere (e.g., on the implement 44 or the tractor 42) in order to regulate operation of the motors 58 and 60.

In other embodiments, a steering assembly other than the powered wheels 54 and motors 58 and 60 may be provided for the vehicle train 40. In certain embodiments, for example, a caster wheel or other ground-engaging element (not shown in FIG. 7A) may be provided with a hydraulic (or other) actuator (not shown in FIG. 7A) configured to adjust the direction of travel of the caster wheel (i.e., the direction in which the caster wheel tends to move when rotated). Such a caster wheel may be oriented at the front of the cart 46, at the rear of the cart 46, or in other locations. In other embodiments, other steering assemblies may be utilized, including arrangements of multiple caster wheels with multiple associated actuators, embodiments with powered caster wheels, and other arrangements.

In order to control operation of the motors 58 and 60 (or actuators of other steering assemblies), as well as various other aspects of the operation of the vehicle train 40, a controller 62 may be provided. The controller 62 may be configured as a computing device with associated processor devices and memory architectures, as a hard-wired computing circuit (or circuits), as a programmable circuit, as a hydraulic, electrical or electro-hydraulic controller, or otherwise. As such, the controller 62 may be configured to execute various computational and control functionality with respect to the tractor 42, the implement 44, the cart 46, or other portions of the vehicle train 40. An example location for the controller 62 is depicted in FIG. 7A. It will be understood, however, that other locations are possible including other locations on the tractor 42, the implement 44, or the cart 46, or various remote locations such as a remotely located control station (not shown). The controller 62 may be in electronic, hydraulic, or other communication with various other systems or devices of the vehicle train 40, as well as remotely located systems or devices. For example, the controller 62 may be in electronic or hydraulic communication with various actuators, sensors, and other devices within (or outside of) the tractor 42, the implement 44, and the cart 46, including the motors 58 and 60. The controller 62 may communicate with other systems or devices (including other controllers) in various known ways, including via a CAN bus (not shown), via wireless communication means, or otherwise.

The vehicle train 40 may further include various sensing devices, including various sensors, receivers, and so on. As depicted for example, the sensing devices of the vehicle train 40 include sensors 64 and 66 and GPS device 68, each of which may be in communication with the controller 62. The sensors 64 and 66 and the GPS device 68 may be disposed at various locations on the vehicle train 40 (or elsewhere). As depicted, for example, the sensor 64 is disposed on the towing connection 48 near the attachment point to the tractor 42, the sensor 66 is disposed on the towing connection 50 near the attachment point to the implement 44, and the GPS device 68 is disposed on the tractor 42. In other embodiments, the sensors 64 and 66 (or other similar sensing devices) may be disposed elsewhere on the towing connections 48 and 50, on any of the tractor 42, the implement 44, or the cart 46, and so on. Likewise, the GPS device 68 (or other similar sensing devices, such as other GPS devices) may be disposed on the implement 44, the cart 46, or elsewhere.

The sensors 64 and 66 (or other sensing devices) may be configured to detect various parameters, including various orientation information. Orientation information, with regard to a particular vehicle (e.g., the cart 46) may include indicators of the absolute or relative position of the vehicle, the tilt (e.g., pitch, yaw, or roll) of the vehicle with respect to a reference frame (e.g., normal, flat-ground orientation of the vehicle), or other aspects of the vehicle's orientation in space. In certain embodiments, for example, the sensors 64 and 66 may be configured to detect indicators of the relative angle of the towing connections 48 and 50, respectively, with respect to the tractor 42, the implement 44, or the cart 46. Similarly, the sensors 64 and 66 may be configured to detect indicators of the relative position of any of the vehicles 42, 44, or 46 of the vehicle train 40 with respect to each other. In this regard, for example, the sensors 64 and 66 may be configured as rotational sensors (e.g., to measure angular movement of the towing connections 48 and 50 at various attachment points), as load sensors (e.g., to measure the amount and direction of force applied along the towing connections 48 and 50), as torque sensors (e.g., to measure torque at the towing connections 48 and 50), or in various other ways.

The GPS device 68 may also be configured to detect various parameters, including orientation information. For example, the GPS device 68 may be configured to detect the absolute (or relative) position of various of the vehicles 42, 44, or 46, or of various other components of the vehicle train 40. In certain embodiments, the GPS device 68 (or another sensing device) may be configured to detect the tilt (e.g., pitch, roll, or yaw) of the tractor 42 (or another vehicle or component of the vehicle train 40), with respect to the reference orientation (e.g., the normal orientation of the tractor 42).

It will be understood that the sensors 64 and 66, the GPS device 68, and various other sensing devices (e.g., other GPS devices (not shown)) may interconnect and interoperate with the controller 62 (or other devices) in various ways. For example, in certain embodiments, the various sensing devices may provide relatively unprocessed signals (e.g., raw voltages) to the controller 62, based upon various detected parameters.

In certain embodiments, various sensing devices may be configured to include various computing systems or processing capabilities (or vice versa), such that the sensing devices may provide the controller 62 with processed data (or vice versa). For example, the GPS device 68 may detect various signals and parameters, process the detected data into location coordinates, tilt angles (e.g., degrees of roll) and so on, then provide the processed data to the controller 62. As another example, the sensors 64 and 66 may provide the controller 62 with the actual angle measurement between the towing connections 48 and 50 and the tractor 42, implement 44, or cart 46, rather than raw voltages or currents from angle measurements.

In certain embodiments, the controller 62 may be integrated with one or more of the various sensing devices (or vice versa), such that the one or more sensing devices and the controller 62 may be viewed as a single sensing and processing device. For example, rather than the location depicted in FIG. 1, the controller 62 may be formed as a single unit with the GPS device 68, or one of the sensors 64 or 66.

In certain embodiments, the controller 62 may be configured to derive various parameters (including orientation information) based upon the orientation information determined by the sensing devices. For example, where the sensor 66 is configured to measure an angle between the towing connection 50 and the implement 44, the controller 62 may be configured to utilize geometric, mechanical, dynamic, or other characteristics of the vehicle train 40 to determine the angle between the towing connection 50 and the cart 46, the relative orientation of the cart 46 with respect to the implement 44, and so on. As another example, the controller 62 may be configured to utilize angle information from the sensors 64 and 66 (e.g., direct angle measurements, measurements of towing force direction, and so on), in combination with location information from the GPS device 68 for the tractor 42, in order to determine the absolute position of each vehicle 42, 44, and 46 of the vehicle train 40 within a field.

Figure 7B:
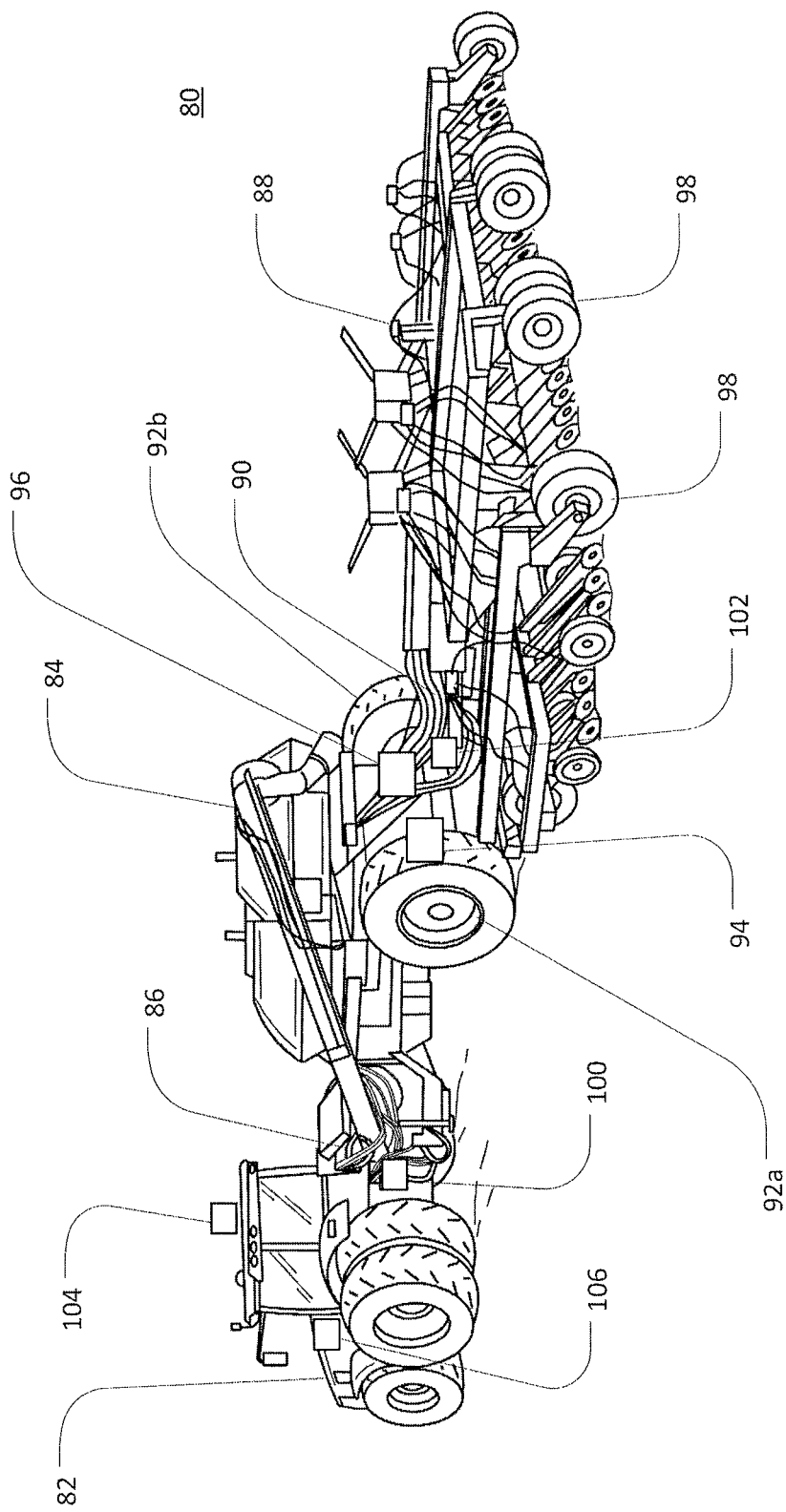

In the embodiment depicted in FIG. 7A, a powered towed vehicle (i.e., the commodity cart 46) is disposed behind another towed vehicle (i.e., the seed-planting implement 44) with respect to the tow vehicle (i.e., the tractor 42). Other configurations may be possible, including those with a powered towed vehicle disposed between a tow vehicle and another towed vehicle. Referring also to FIG. 7B, in another example vehicle train 80, a tractor 82 is configured to tow a commodity cart 84 via a towing connection 86, and the commodity cart 84 is configured to tow a seed-planting implement 88 via a towing connection 90. As depicted, the commodity cart includes left-side and right-side wheels 92a and 92b, which may be powered, respectively, by motors 94 and 96. In other embodiments, other steering assemblies with associated steering actuators may be utilized (e.g., a caster wheel with a hydraulic actuator for adjusting the direction of travel of the caster wheel). The implement 88 includes various un-powered wheels 98, which may be distributed in various ways across the frame of the implement 88. As noted above with respect to the vehicle train 40, other configurations are possible, including configurations with another tow vehicle in place of the tractor 82, another powered towed vehicle in place of the cart 84, another towed vehicle in place of the seed-planting implement 88, other towing connections of different configurations, and so on.

The vehicle train 80 may include various control devices, which may be configured similarly, in various ways, to the devices described with respect to the vehicle train 40. As depicted, for example, the tractor 82 includes a GPS device 104 and a controller 106, which may be in communication with various other devices of the vehicle train 80. A sensor 100 (e.g., an angle, force, or other sensor) is disposed on the towing connection 86 and a sensor 102 (e.g., an angle, force, or other sensor) is disposed on the towing connection 90, such that the sensors 100 and 102 may determine orientation information with regard to various aspects of the vehicle train 80.

Various other configurations of a vehicle train may also be possible. In certain embodiments, the seed-planting implements 44 and 88 (or another vehicle utilized in place of the implements 44 and 88) may include various powered ground-engaging members (e.g., various powered wheels). In certain embodiments, additional towed (or tow) vehicles may be utilized. For example, a series of implements or other vehicles (not shown) may be towed behind the commodity cart 84 (or another powered towed vehicle utilized in place of the cart 84) or may be towed ahead of the commodity cart 46 (or another powered towed vehicle utilized in place of the cart 46). Likewise, a powered towed vehicle for a vehicle train similar to the vehicle trains 40 and 80 may be configured as a vehicle other than a commodity cart such as the carts 46 or 84. Accordingly, as also noted above, it will be understood that the control system (and method) described herein may be utilized with respect to vehicle trains other than the example vehicle trains 40 and 80.

In various implementations, various controllers, motors, sensing devices, and so on, may be utilized to implement a steering correction for one towed vehicle (and for the relevant vehicle train in general) via the control of a different towed vehicle with powered ground-engaging elements (e.g., powered wheels). In the discussion below, examples of such steering control are described with respect to the vehicle train 40 of FIG. 7A. It will be understood, however, that other implementations may be possible, including with respect to other vehicle trains (e.g., the vehicle train 80, or others).

In various implementations, it may be useful to utilize the controller 62, the motors 58 and 60, and one or more of the sensor 64, the sensor 66, and the GPS device 68 in order to determine, and apply, a steering correction for one or more vehicles of the vehicle train 40. For example, deviation of the implement 44 from a target path of travel during planting operations may result in unexpected or undesired planting patterns. Accordingly, in order to ensure appropriate planting, a steering correction may be determined (e.g., based upon determination of various orientation information) and applied for the implement 44. In various embodiments, such a steering correction for the implement 44 may be implemented via control of the cart 46, rather than (or in addition to) direct control of the implement 44.

Figure 8A:
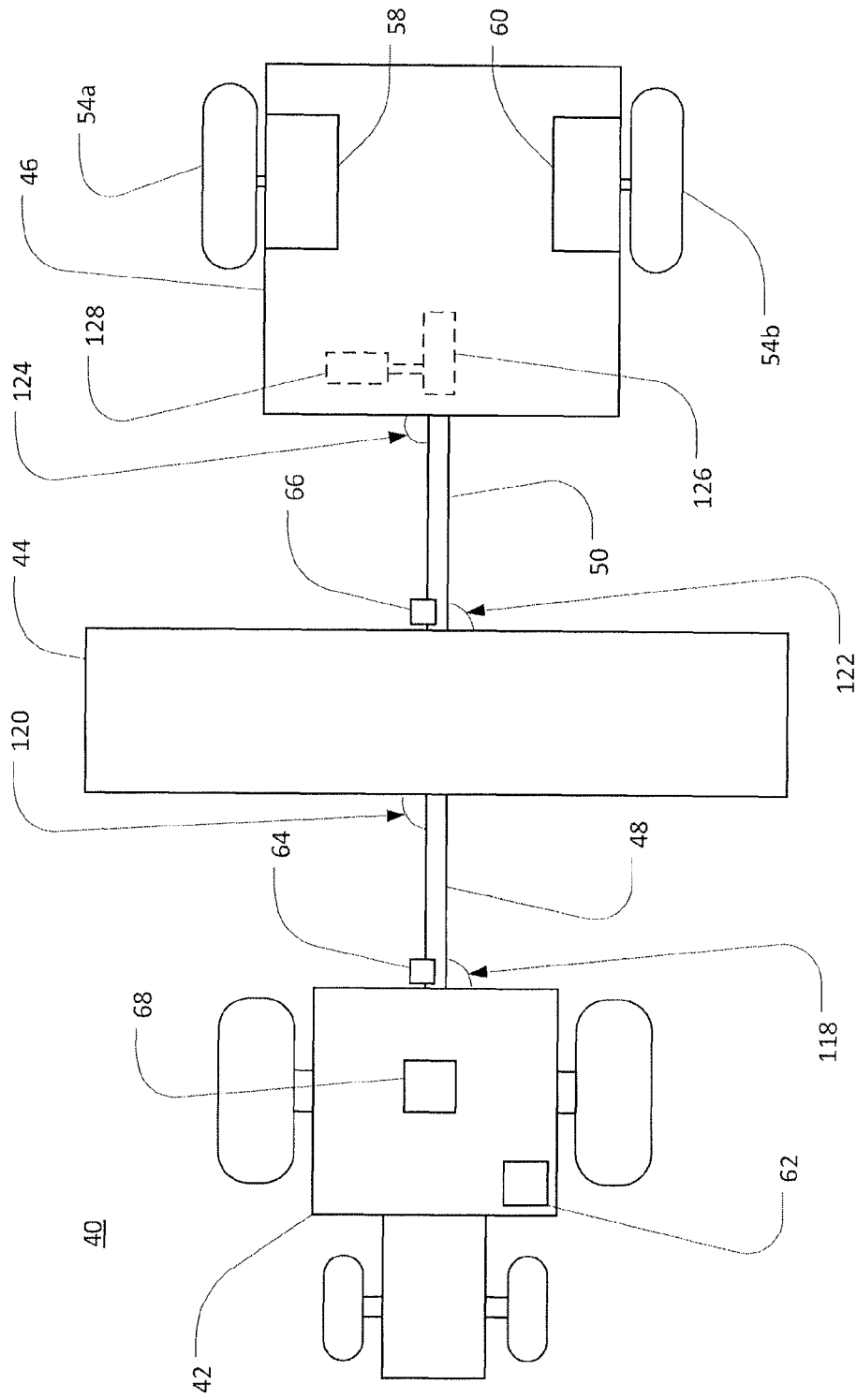
FIGS. 8A and 8B are schematic top views of the vehicle train of FIG. 7A during operation of the vehicle-train steering control system.

Referring also to FIG. 8A, during straight travel over level ground (and during other operations), pulling force from the tractor 42 may cause the vehicle train 40 to travel in a relatively straight line. Accordingly, if the tractor 42 is caused to follow a particular (straight) path of travel, the implement 44 (and the cart 46) may tend to also follow that path. This may be useful, for example, if the tractor 42 is caused to travel along a desired (straight) path of travel for a planting operation with the seed-planting implement 44. As seen in FIG. 8A, straight-line travel of the entire vehicle train 42 may be characterized by measurements of approximately 90 degrees for various angles 118, 120, 122, and 124 between the towing connections 48 and 50 and the various vehicles 42, 44, and 46. Correspondingly, deviation from straight-line travel (or other target paths) may be indicated by other measurements of the various angles 118, 120, 122, and 124. As noted above, in certain implementations, the values of the angles 118, 120, 122, and 124 (or various indicators thereof, such as various force vectors being applied at the towing connections 48 and 50) may be determined by the sensors 64 and 66 (or otherwise).

Figure 8B:
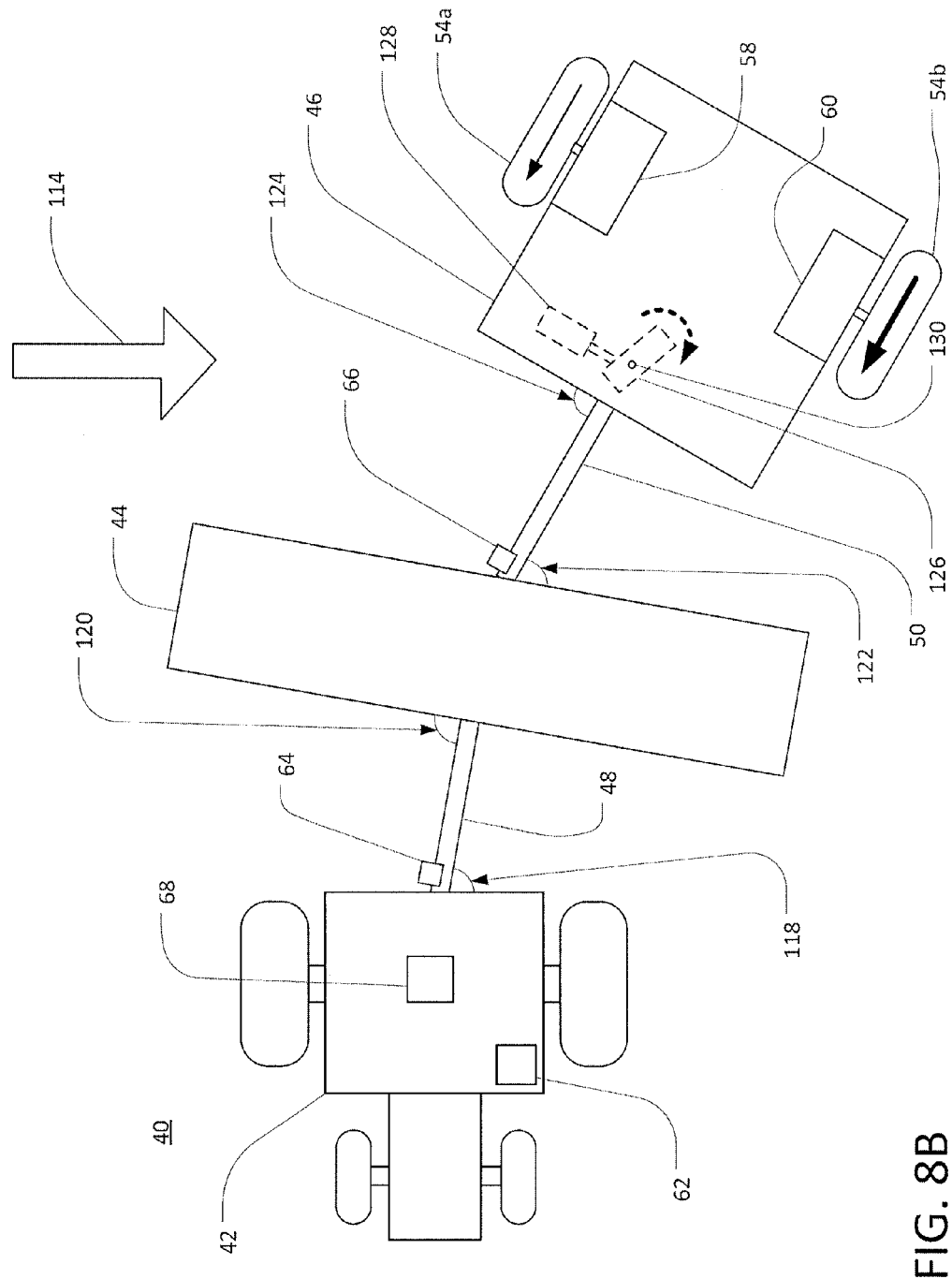

During relatively straight travel, the implement 44 may generally follow the path of travel of the tractor 42, such that the implement 44 may be towed with substantial accuracy along a target path of travel simply by following that path of travel with the tractor 42. In various circumstances, however, the vehicle train 40 may not travel in a relatively straight line. During turns, for example, the implement 44 and the cart 46 may trail behind the tractor 42 (and may be disposed with respect to each other) such that the implement 44 and the cart 46 may not exactly follow the path of travel of the tractor 42. Referring also to FIG. 8B, a similar misalignment of the paths of travel of the implement 44 and cart 46, with respect to the path of travel of the tractor 42, may occur during travel of the vehicle train 40 over sloping terrain (e.g., with the arrow 114 in FIG. 8B indicating the down-slope direction). The disclosed steering control system (and method) may automatically determine and apply steering corrections, in these and other scenarios, in order to assist an operator in maintaining the appropriate path of travel for the implement 44 (and for the vehicle train 40 generally).

In certain implementations, as noted above, a steering correction may be determined for the implement 44 during travel of the vehicle train 40 (or a portion thereof) on sloping terrain. For example, as the vehicle train 40 travels along terrain that slopes downward in a direction extending at least partly laterally across the vehicle train 40 (e.g., in the direction of the arrow 114), the force of gravity on the cart 46 may cause the cart 46 to slip down the slope (i.e., in a down-slope direction). In turn, this slipping of the cart 46 may pull the implement 44 down the hill and away from a target path of travel of the implement 44. (It will be understood that down-slope slippage of the implement 44 itself may also contribute to this deviation from the target path.) Accordingly, in order to return the implement 44 to the target path of travel, a steering correction may be needed.

In certain implementations, using orientation information from one or more of the sensor 64, the sensor 66, and the GPS device 68, the controller 62 may determine a steering correction, for travel on sloping terrain, that will tend to return the implement 44 to a target path of travel (e.g., a straight line across a hill-side). For example, in certain implementations, the controller 62 may receive tilt information from the GPS device 68, or angle information from either of the sensors 64 and 66 (e.g., information indicating the value of one or more of the angles 118, 120, 122, and 124). The controller 62 may then utilize this orientation information (or other parameters derived therefrom) to determine a path that the implement 44 may follow to return to (or at least move closer to) the target path of travel. For example, based upon identification of too-large angle measurement for the angles 120 or 124, the controller 62 may determine that the cart 46 and the implement 44 are slipping down-slope with respect to a target path of travel. Accordingly, the controller 62 may determine that an up-slope steering correction may be needed. The magnitude and timing of such a steering correction (and others) may be determined based upon various factors, including the geometry of the vehicle train 40 and the various vehicles 42, 44, and 46, the dynamic characteristics of the various vehicles 42, 44, and 46, the degree of deviation from a target path, controller or user settings relating to the speed with which deviations are corrected, and so on.

Once an appropriate steering correction has been determined (e.g., as described above), the controller 62 may control the motors 58 and 60 to cause a difference in rotational speed between the right-side powered wheels 54*a* and the left-side powered wheels 54*b* of the cart 46 (or a difference in other ground-engaging speed of other left- and right-side ground-engaging members of the cart 46). In this way, the powered rotation of the wheels 54*a* and 54*b* may steer the cart 46, in order to push the implement 44 back to (or at least towards) the target path of travel. For example, where the wheels 54*b* are down-slope of the wheels 54*a* (i.e., as in FIG. 8B) and an up-slope steering correction is determined, the controller 62 may cause the motor 60 to rotate the wheels 54*b* at a higher speed than the motor 58 rotates the wheels 54*a*. Accordingly, the cart 46 may be steered in an up-slope direction and may thereby push the implement 44 up-slope via the towing connection 50, in order to correct the deviation of the implement 44 from the target path of travel.

In certain implementations, the steering of the cart 46 may be modulated based upon continual detection of orientation information by the various sensing devices of the vehicle train 40. For example, where the measurements of the angles 118, 120, 122 or 124 indicate a large deviation from a straight target path, the controller 62 may cause the motors 58 and 60 to implement a relatively large difference in ground-engaging speeds of the wheels 54*a* and 54*b*. As the angle measurements indicate appropriate shrinking of the deviation, the controller 62 may cause a correspondingly reduced difference in the ground-engaging speeds of the wheels 54 and 54*b*, such that the implement 44 is smoothly moved back onto the target path.

In certain implementations, the controller 62 may determine a steering correction in advance of a deviation of the implement 44 (or other vehicle of the vehicle train 40) from a target path of travel. For example, the controller 62 may be configured to use a predetermined map of a field, along with orientation information from the GPS device 68, ground-speed information for the tractor 42, and so on, in order to identify that the vehicle train 40 is about to travel over sloping terrain. As noted above, it may be expected that the weight of the cart 46 (and other factors) may tend to cause the implement 44 to deviate from a target path of travel during travel over certain sloping terrain. Accordingly, upon identifying that the vehicle train 40 is about to travel over sloping terrain, the controller 62 may determine a pre-emptive steering correction for the implement 44, which may be applied via speed differences at motors 58 and 60, in order to avoid (or at least reduce) the expected deviation. In certain implementations, such a speed difference may be modulated based on various factors, including, for example, the expected degree of incline of the upcoming sloping terrain.

In certain implementations, such a pre-emptive (or predetermined) steering correction may be implemented based upon orientation information for a portion of the vehicle train 40. For example, as the tractor 42 first drives onto sloping terrain, the tractor 42 may experience various degrees of tilt while the implement 44 and the cart 46 are still disposed on relatively flat ground. Based upon detection of this tilt at the tractor 42 (e.g., by the GPS device 68, a gyroscope device, and so on), an expected upcoming deviation of the implement 44 from a target path may be identified, and a corresponding steering correction for the implement 44 may be preemptively determined. For example, based upon the speed and location of the tractor 42 and the geometry of the towing connection 48 and the implement 44, it may be determined that ground-engaging members of the implement 44 will reach the sloping terrain at a particular time. If a deviation from a target (e.g., straight) path is expected based upon the implement 44 traveling on the sloping terrain, a steering correction for the implement 44 may be applied via the cart 46 at (or even before) the particular time.

In certain implementations, the controller 62 may be configured to determine steering corrections for a turning path of travel of the vehicle train 40. For example, as the vehicle train 40 executes a turn, the implement 44 and cart 46 may tend to track paths of travel with generally smaller radii of curvature than the path of travel of the tractor 42. It may be useful to control the motors 58 and 60 of the cart 46 in order to correct for this difference in travel paths between the tractor 42 and the implement 44. For example, in a turn resulting in a similar orientation of the vehicle train 40 depicted in FIG. 8B, the controller 62 may apply a steering correction for the implement 44 by causing the motor 60 to rotate the wheels 54b at a higher speed than the motor 58 rotates the wheels 54a. In this way, the cart 46 may urge the implement 44 out of its smaller radius turn, towards the curving path of travel traced by the tractor 42 (or another target path). The controller 62 may identify a turning operation for the vehicle train 40 in various ways, including via the sensors 64 and 66 (e.g., through measurement of the angles 118, 120, 122 and 124), via the GPS device 68, via sensors (not shown) on the steerable wheels or operator controls of the tractor 42, or in various other ways.

In certain implementations, steering corrections may be determined and applied for straight travel over relatively level ground, Over level ground, towed vehicles may tend to generally follow a straight path of the tow vehicle with little deviation, but some deviations from a target path may still occur. For example, an event such as an impact on the implement 44 or the cart 46 may push the implement 44 or the cart 46 out of alignment with the path of travel of the tractor 42. Generally, the forward movement of the tractor 42 may tend to correct such a deviation. In certain implementations, however, it may be useful to supplement this natural tendency in various circumstances (e.g., in order to return the implement 44 or cart 46 to a straight path with increased speed). For example, based upon determining a deviation from a straight path (e.g., as determined from angle measurements detected by the sensors 64 and 66), the controller 62 may control the motors 58 and 60, in order to rapidly correct the deviation.

As another example, during reverse travel of the vehicle train 40 (e.g., as the tractor backs up to push the implement 44 and the cart 46 in a reverse direction), it may be relatively difficult for an operator to manually maintain a straight-line (or appropriately curved) path of travel for the entire vehicle train 40. For example, based upon slight deviations in force, terrain, or other factors, the implement 44 or the cart 46 may tend to steer away from the target path of travel, even to the point of a jack-knife orientation. It may accordingly be useful for the controller 62 to apply appropriate steering corrections to the implement 44 (and the cart 46) during reverse travel.

The controller 62 may identify a reverse-travel operation for the vehicle train 40, and the need to correct steering during such an operation, in various ways. For example, the controller 62 may identify reverse-travel operation and the need for steering corrections via the sensors 64 and 66 (e.g., through measurement of the angles 118, 120, 122 and 124), via the GPS device 68, via sensors (not shown) on the wheels of the tractor 42, or in various other ways. Steering of the cart 46 may then be controlled, via control of the motors 58 and 60, to apply appropriate steering corrections to the implement 44 and to the cart 46.

In the various steering corrections noted above, and other steering corrections, the controller 62 may cause a difference in the ground-engaging speeds of the wheels 54a and 54b (or other ground-engaging elements of other towed vehicles) in various ways. In certain implementations, the controller 62 may control the motors 58 and 60 to provide power for forward rotation to each of the wheels 54a and 54b, but at different speeds. In this way, forward drive force may be provide for the cart 46 at each of the wheels 54a and 54b, but the speed difference between the wheels 54a and 54b may result in a turning of the cart 46 (and, thereby, of the implement 44). In certain implementations, the controller 62 may control the motors 58 and 60 to provide power for forward rotation to only one set of wheels 54a and 54b. In certain implementations, the controller 62 may control the motors 58 and 60 to provide braking force (or power for rearward rotation) to one or more of the sets of wheels 54a and 54b.

As noted above, in certain embodiments, a steering assembly may be utilized that is different from the depicted arrangement of motors 58 and 60 and wheels 54a and 54b. Still referring to FIGS. 8A and 8B, for example, a caster wheel 126 (or other ground-engaging element) may be provided, along with a hydraulic (or other) actuator 128 for changing the direction of travel of the caster wheel 126. As depicted, for example, the caster wheel 126 may be mounted to the cart 46 such that the caster 126 may be pivoted by the actuator 128 about a pivot axis 130. In this way, by the actuator 128 pivoting of the caster wheel 126 about the axis 130, the caster wheel 126 may be controllably oriented with various directions of travel (e.g., straight forward, with respect to the cart 46, as depicted). The steering of the cart 46, and thereby correction of the steering of the implement 44, may accordingly be controlled by using the actuator 128 to pivot the caster wheel 126 about the pivot axis 130. Such control may be implemented in addition, or as an alternative, to the control of the steering of the cart 46 with the motors 58 and 60, or with various other steering assemblies. In certain implementations, the caster 126 (or other ground-engaging devices or steering assemblies) may be disposed at other locations on the cart 46. For example, the caster 126 and actuator 128, or a pair of similar casters and actuators, may be disposed toward the rear of the cart 46, or in various other locations.

Various example vehicle trains and example steering control systems are disclosed above. In various implementations, these and other systems may be generally utilized to implement a vehicle-train steering control ("VTSC") method, in order to control aspects of steering for various vehicle trains. A VTSC method may be implemented in various ways, including through automatic operations executed by the controller 62 of the vehicle train 40, through manual operations (e.g., manually controlled steering operations), or through a combination of automatic and manual operations.

Figure 9:
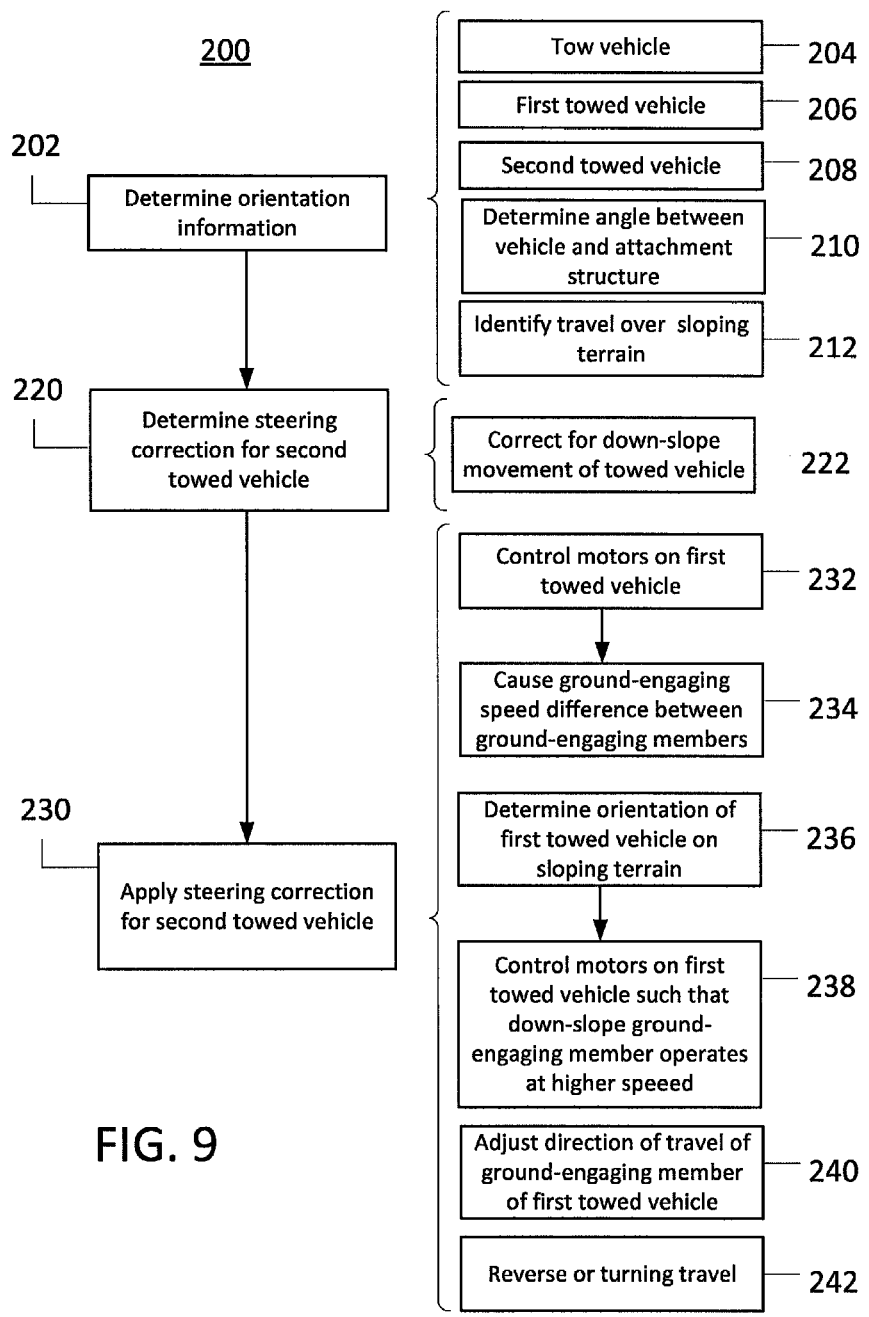
FIG. 9 is a diagrammatic representation of aspects of a vehicle-train steering control method for use with the vehicle trains of FIGS. 7A and 7B.

Referring also to FIG. 9, an example VTSC method 200 may include determining 202 orientation information for a relevant vehicle train. Orientation information determined 202 with regard to a particular vehicle (e.g., the cart 46) may include indicators of the absolute or relative position of the vehicle, the tilt (e.g., pitch, yaw, or roll) of the vehicle with respect to a reference frame (e.g., normal, flat-ground orientation of the vehicle), or other aspects of the vehicle's orientation in space (e.g., the absolute location of the vehicle or the relative location of the vehicle with respect to a reference point). Orientation information may be determined 202 for various vehicles of vehicle train, including a tow vehicle 204, a first towed vehicle 206, or for a second towed vehicle 208. In certain implementations, the first towed vehicle 206 may be a towed vehicle with powered and individually controllable wheels (e.g., a vehicle similar to the cart 46), and the second towed vehicle 208 may be a towed vehicle without powered wheels (e.g., a vehicle similar to the implement 44).

Orientation information may be determined 202 in various ways. In certain implementations, relevant orientation information may be determined 202 by a sensing device, such as the GPS device 68, one or both of the sensors 64 and 66, or another sensing device. For example, a sensing device (e.g., one of the sensors 64 and 66) may determine 202 orientation information relating to one of the vehicle 42, 44 or 46 by determining 210 the measurement (or other indicator) of one or more of the angles 118, 120, 122, and 124 between the vehicles 42, 44, and 46 and the attachment structures 48 and 50. Likewise, a GPS device (or devices) configured to separately identify the locations of each of the vehicles 42, 44 and 46, and may thereby determine 210 the measurement (or other indicator) of one or more of the angles 118, 120, 122, and 124.

In certain implementations, a sensing device (e.g., the GPS device 68) may determine 202 orientation information based upon identifying 212 travel of one or more vehicles of a vehicle train over sloping terrain. For example, a gyroscope or other device (e.g., as included in the GPS device 68) may be utilized to determine a degree of tilt of the tractor 42, the implement 44, or the cart 46, which may indicate that one or more of the vehicles 42, 44, and 46 is traveling on sloping terrain. In certain implementations, values from a particular sensing device may be analyzed in light of a topographical representation of a field in order to identify 212 travel over sloping terrain. For example, a current position of the tractor 42 (e.g., as determined by the GPS device 68) may be compared with a pre-existing topographical map of a field in order to identify 212 whether the tractor 42 is traveling over sloping ground. Similarly, measurements of the angles 118, 120, 122, or 124 by the sensors 64 and 66 may be combined with trajectory information for the tractor 42 (e.g., from the GPS device 68) in order to identify 212 whether the implement 44 or the cart 46 may be traveling over sloping terrain.

Based upon the determined 202 orientation information, a steering correction for the second towed vehicle 208 may then be determined 220. For example, a controller may receive orientation information (e.g., tilt information, location information, and so on) from various sensing devices and may analyze the orientation information in order to identify a deviation of one of the vehicles 206 or 208 from a target path. Based upon the identified deviation (and, in certain implementations, the determined 202 orientation information), the controller may then determine 220 a corrective path of travel that one of the vehicles 206 or 208 may follow to return to the target path. In certain implementations, a steering correction may be determined 220 in particular for the second (e.g., unpowered) towed vehicle 208.

In certain implementations, the determined 202 orientation information may be used directly to determine 220 a steering correction. For example, where the GPS device 68 determines 202 orientation information including the absolute position of the various vehicles 42, 44, and 46 in a field (or the relative position of the various vehicles 42, 44, and 46 with respect to each other), an appropriate steering correction may be determined 220 based directly upon such orientation information. As another example, where the GPS device 68 identifies 212 current (or upcoming) travel over particular sloping terrain (i.e., terrain of known or detectable contours) and the behavior of the vehicle train 40 on such a slope is already known (or may be determined by the controller 62 from known characteristics of the vehicles 42, 44, and 46), a steering correction may be determined 210 directly from the identified 212 travel.

A steering correction may also be determined 220 directly, for example, in implementations in which the sensors 64 and 66 determine 210 a particular angle or set of angles between the various vehicles and attachment structures. For example, for a particular course of travel (e.g., straight travel, turns, reverse travel, and so on) over particular ground (e.g., sloping ground or flat ground), any determined 210 angle above (or below) a particular threshold may automatically trigger a particular steering correction.

In certain implementations, a steering correction may be determined 220 for the second (e.g., unpowered) towed vehicle 208 based upon orientation (or other) information that is derived from the determined 202 orientation information. For example, a first type of orientation information may be determined 202 by a sensing device and a second type of orientation information may be derived from the determined 202 first type of orientation information. A steering correction may then be determined 220 based upon the derived orientation information.

With respect to the vehicle train 40, for example, where a steering correction is to be determined 220 based upon the measure of the angles 118, 120, 122, and 124 (or other angles between various vehicles and attachment structures), the sensors 64 and 66 may determine 210 the angles 118, 120, 122, and 124 directly, or one or more of the angles 118, 120, 122, and 124 may be determined 210 indirectly. For example, the controller 62 may determine 210 the various angles 118, 120, 122, and 124 based upon the direction (or other characteristics) of towing forces on the towing connections 48 and 50 (e.g., as measured by the sensors 64 and 66), based upon GPS measurements (e.g., from the GPS device 68), based upon known or expected behavior of various of the vehicles 42, 44, and 46 during identified 212 travel over a particular incline (e.g., as identified 212 by the GPS device 68), and so on.

In implementations where travel over sloping terrain has been identified 212 (e.g., directly by a GPS device or other sensing device, or indirectly via various determined 210 angles), the steering correction may be determined 220 in order to correct 222 for down-slope movement (e.g., down-slope slippage) of one of the towed vehicles 206, 208. For example, where travel over sloping terrain has been identified 212, the cart 46 is determined to be slipping down-slope on the sloping terrain (e.g., as described with respect to FIG. 8B). Further, the cart 46 may be determined to be pulling the implement 44 down-slope as the cart 46 slips (e.g., based upon determined 202 orientation information, such as location or angle information, for the implement 44 or the cart 46). As noted above, relatively precise travel of the implement 44 along a target path may be important to ensure accurate planting operations. Accordingly, it may be useful to determine 220 a steering correction for the implement 44 (as well as the cart 46), which will return the implement 44 quickly and efficiently to the target path.

Once a steering correction has been determined 220, the steering correction may be applied 230, in order to correct the path of travel of the second towed vehicle 208 (and other vehicles of the vehicle train). In various implementations, a steering correction for the second towed vehicle 208 may be applied 230 via control 232 of motors on the first towed vehicle 206, such that the first towed vehicle 206 is steered in order to correct the steering of the second towed vehicle 208. For example, with respect to the vehicle train 40, the motors 58 and 60 may be separately controlled 232 in order to cause 234 a difference in the ground-engaging speeds of the opposing wheels 54a and 54b. This difference may tend to steer the cart 46 in a particular direction, such that the cart 46 imposes the determined 220 steering correction on the implement 44. It will be understood that other configurations may be possible, in which other motors are controlled 232 to impose differences in ground-engaging speeds between different ground-engaging members of other towed vehicles.

In certain implementations, a steering correction may be determined 220 in order to correct the steering of the second towed vehicle 208 during identified 212 travel over sloping terrain (e.g., as described above with respect to FIG. 8B). In such cases, applying 230 the steering correction via control 238 of motors on the first towed vehicle 206 may be based upon first determining 236 the orientation of the first towed vehicle 206 on the sloping terrain, then controlling 238 motors on the first towed vehicle such that a down-slope ground-engaging member operates at a higher ground-engaging speed than an up-slope ground-engaging member. For example, with respect to the configuration depicted in FIG. 8B, information from the GPS device 68 or the sensors 64 and 66 may be utilized to identify 212 travel of the vehicle train 40 over sloping terrain, and to determine 236 the orientation of the cart 46 with respect to the slope. The motors 58 and 60 may then be controlled 238 such the motor 60 (i.e., the down-slope motor, as depicted) provides for faster rotation at the wheel 54b than the motor 58 (i.e., the up-slope motor, as depicted) provides for the wheel 54a.

In certain implementations, applying 230 a steering correction for the second towed vehicle may include other types of control of various steering assemblies. In certain implementations, applying 230 a steering correction for the second towed vehicle may include adjusting 240 a direction of travel of a ground-engaging member of the first towed vehicle. For example, with respect to the configuration depicted in FIG. 8B, after a steering correction has been determined 220 for the implement 44, the actuator 128 may be controlled to pivot the caster wheel 126 about the pivot axis 130 and thereby change the direction of travel of the caster wheel 126. This, in turn, may steer the cart 46 such that the determined 220 steering correction may be applied to the implement 44. In other implementations, other configurations of a steering assembly may be similarly controlled. For example, a rack-and-pinion or other assembly may be utilized to adjust the direction of travel of a pivoting, but non-caster wheel (or wheels) on the cart 46.

In certain implementations, a steering correction for the second towed vehicle 208 may be determined 220 and applied 230 during reverse or turning travel 242 of the relevant vehicle train. For example, with respect to the vehicle train 40 as depicted in FIG. 8B, if the vehicle train 40 is traveling generally from left to right (from the perspective of FIG. 8B), it may be identified that the vehicle train 40 is engaged in reverse travel 242. Based upon orientation information determined 202 by (or based upon signals from) the GPS device 68, the sensor 64, or the sensor 66, an appropriate steering correction may be determined 220 and then applied 230 during the reverse travel 242. Similarly, with respect to the vehicle train 40 as depicted in FIG. 8B, it may be identified that the vehicle train 40 is engaged in turning travel 242 (whether on or off of the slope indicated by the arrow 114). Based upon orientation information determined 202 by (or based upon signals from) the GPS device 68, the sensor 64, or the sensor 66, an appropriate steering correction may be determined 220 and then applied 230 during the turning travel 242.

As also noted, the various scenarios described above are presented as examples only. Other configurations of a vehicle train and other implementations of a VTSC method may be possible. For example, the various operations of the VTSC method 200 described above may alternatively be applied with respect to the vehicle train 80, in which the first towed vehicle 206 (i.e., the cart 84) is between the tow vehicle 204 (i.e., the tractor 82) and the second towed vehicle 208 (i.e., the implement 88).

As will be appreciated by one skilled in the art, various aspects of the disclosed subject matter may be embodied as a computer-implemented method, a system, or a computer program product. Accordingly, certain implementations may be implemented entirely as hardware, entirely as software (including firmware, resident software, micro-code, etc.) or as a combination of software and hardware aspects. Furthermore, certain implementations may take the form of a computer program product on a computer-usable storage medium having computer-usable program code embodied in the medium.

Any suitable computer usable or computer readable medium may be utilized.

The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain implementations are described herein with reference to flowchart illustrations and/or block diagrams of methods, apparatus (systems) and computer program products according to implementations of the disclosure. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which includes one or more executable instructions for implementing the specified logical function(s). Further, in some alternative implementations, the functions noted in the various blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A steering control system for a vehicle train with a tow vehicle, a first towed vehicle with at least one ground-engaging member, and a second towed vehicle, the steering control system comprising:
   a steering assembly for controlling steering of the at least one ground-engaging member of the first towed vehicle;
   one or more sensing devices configured to determine orientation information for one or more of the tow vehicle, the first towed vehicle, and the second towed vehicle, during operation of the vehicle train; and
   a controller configured to:
      determine a steering correction for the second towed vehicle based upon the determined orientation information; and
      apply the steering correction for the second towed vehicle by, at least in part, controlling the steering assembly to steer the first towed vehicle.

2. The steering control system of claim 1, wherein the first towed vehicle is towed by the tow vehicle via a first towing connection connecting the tow vehicle to the first towed vehicle, and the second towed vehicle is towed by the first towed vehicle via a second towing connection connecting the first towed vehicle to the second towed vehicle.

3. The steering control system of claim 2, wherein at least one of the controller and the one or more sensing devices is further configured to determine, based upon the determined orientation information, one or more of an angle between the tow vehicle and the first towing connection, an angle between the first towing connection and the first towed vehicle, an angle between the first towed vehicle and the second towing connection, and an angle between the second towing connection and the second towed vehicle; and
   wherein the controller is further configured to determine the steering correction based upon the determined one or more angles.

4. The steering control system of claim 1, wherein the second towed vehicle is towed by the tow vehicle via a first towing connection connecting the tow vehicle to the second towed vehicle, and the first towed vehicle is towed by second towed vehicle via a second towing connection connecting the second towed vehicle to the first towed vehicle.

5. The steering control system of claim 4, wherein one of the controller and the one or more sensing devices is further configured to determine, based upon the determined orientation information, one or more of an angle between the tow vehicle and the first towing connection, an angle between the first towing connection and the second towed vehicle, an angle between the second towed vehicle and the second towing connection, and an angle between the second towing connection and the first towed vehicle; and wherein the controller is further to determine the steering correction based upon the determined one or more angles.

6. The steering control system of claim 1, wherein the one or more sensing devices includes one or more of a GPS device and an angle-measuring device.

7. The steering control system of claim 1, wherein the controller is further configured to identify, based upon the orientation information, travel of one or more of the tow vehicle, the first towed vehicle, and the second towed vehicle over sloping terrain; and
wherein the steering correction for the second towed vehicle is determined to correct for down-slope movement of one or more of the first towed vehicle and the second towed vehicle due to the sloping terrain.

8. The steering control system of claim 1, wherein the steering assembly includes at least one actuator for adjusting a direction of travel of the at least one ground-engaging member; and
wherein applying the steering correction includes controlling the at least one actuator to adjust the direction of travel of the at least one ground-engaging member.

9. The steering control system of claim 1, wherein the steering assembly includes a first motor for powering movement of a first ground-engaging member of the first towed vehicle, in order to move the first towed vehicle, and a second motor for powering movement of a second ground-engaging member of the first towed vehicle, in order to move the first towed vehicle; and
wherein applying the steering correction includes controlling at least one of the first and second motors to steer the first towed vehicle by causing a speed difference between respective ground-engaging speeds of the first and second ground-engaging members.

10. The steering control system of claim 1, wherein the controller is further configured to apply the steering correction during one or more of reverse travel and turning travel of the vehicle train.

11. A steering control method for a vehicle train with a tow vehicle, a first towed vehicle with at least one ground-engaging member and a steering assembly for controlling steering of the at least one ground-engaging member, and a second towed vehicle, the steering control method comprising:
determining, by one or more sensing devices, orientation information for one or more of the tow vehicle, the first towed vehicle, and the second towed vehicle, during operation of the vehicle train;
determining a steering correction for the second towed vehicle based upon the determined orientation information; and
applying the steering correction for the second towed vehicle by, at least in part, controlling the steering assembly to steer the first towed vehicle.

12. The steering control method of claim 11, wherein the first towed vehicle is towed by the tow vehicle via a first towing connection connecting the tow vehicle to the first towed vehicle, and the second towed vehicle is towed by the first towed vehicle via a second towing connection connecting the first towed vehicle to the second towed vehicle.

13. The steering control method of claim 12, further comprising:
determining, based upon the determined orientation information, one or more of an angle between the tow vehicle and the first towing connection, an angle between the first towing connection and the first towed vehicle, an angle between the first towed vehicle and the second towing connection, and an angle between the second towing connection and the second towed vehicle; and
determining the steering correction based upon the determined one or more angles.

14. The steering control method of claim 11, wherein the second towed vehicle is towed by the tow vehicle via a first towing connection connecting the tow vehicle to the second towed vehicle, and the first towed vehicle is towed by second towed vehicle via a second towing connection connecting the second towed vehicle to the first towed vehicle.

15. The steering control method of claim 14, further comprising:
determining, based upon the determined orientation information, one or more of an angle between the tow vehicle and the first towing connection, an angle between the first towing connection and the second towed vehicle, an angle between the second towed vehicle and the second towing connection, and an angle between the second towing connection and the first towed vehicle; and
determining the steering correction based upon the determined one or more angles.

16. The steering control method of claim 11, wherein the steering assembly includes at least one actuator for adjusting a direction of travel of the at least one ground-engaging member; and
wherein applying the steering correction includes controlling the at least one actuator to adjust the direction of travel of the at least one ground-engaging member.

17. The steering control method of claim 11, further comprising:
identifying, based upon the orientation information, travel of one or more of the tow vehicle, the first towed vehicle, and the second towed vehicle over sloping terrain;
wherein the steering correction for the second towed vehicle is determined to correct for down-slope movement of one or more of the first towed vehicle and the second towed vehicle due to the sloping terrain.

18. The steering control method of claim 17, further comprising:
determining, based upon the orientation information, that a first ground-engaging member of the first towed vehicle is disposed down-slope of a second ground-engaging member of the first towed vehicle, with respect to the sloping terrain;
wherein the steering assembly includes a first motor for powering movement of the first ground-engaging member of the first towed vehicle, in order to move the first towed vehicle, and a second motor for powering movement of the second ground-engaging member of the first towed vehicle, in order to move the first towed vehicle;
wherein applying the steering correction includes controlling at least one of the first and second motors such that the first ground-engaging member operates at a higher ground-engaging speed than the second ground-engaging member.

19. The steering control method of claim 11, wherein the steering assembly includes a first motor for powering movement of a first ground-engaging member of the first towed vehicle, in order to move the first towed vehicle, and a second motor for powering movement of a second ground-engaging member of the first towed vehicle, in order to move the first towed vehicle; and
wherein applying the steering correction includes controlling at least one of the first and second motors to steer the first towed vehicle by causing a speed difference between respective ground-engaging speeds of the first and second ground-engaging members.

20. The steering control method of claim 11, further comprising:
 identifying one or more of reverse travel and turning travel of the vehicle train;
 wherein the steering correction is applied during one or more of the reverse travel and turning travel of the vehicle train.

* * * * *